United States Patent [19]

Roth

[11] Patent Number: 5,250,952

[45] Date of Patent: Oct. 5, 1993

[54] METHOD OF CORRECTING ROTATIONAL MOTION ERROR IN SAR AND ISAR IMAGERY

[76] Inventor: Duane Roth, 405 West Wilson St., Apartment B, Ridgecrest, Calif. 93555

[21] Appl. No.: 727,257

[22] Filed: Jul. 1, 1991

[51] Int. Cl.⁵ .............................................. G01S 13/90
[52] U.S. Cl. ......................................................... 342/25
[58] Field of Search ................................... 342/25, 165

[56] References Cited

U.S. PATENT DOCUMENTS

| | | | |
|---|---|---|---|
| 3,905,031 | 9/1975 | McCord | 343/5 CM |
| 4,034,370 | 7/1977 | Mims | 343/5 CM |
| 4,134,113 | 1/1979 | Powell | 343/5 CM |
| 4,227,194 | 10/1980 | Herman et al. | 343/5 CM |
| 4,339,752 | 7/1982 | Williams et al. | 343/5 CM |
| 4,387,373 | 6/1983 | Longuemare, Jr. | 343/5 CM |
| 4,471,357 | 9/1984 | Wu et al. | 343/5 CM |
| 4,771,287 | 9/1988 | Mims | 342/25 |
| 4,786,906 | 11/1988 | Krogager | 342/25 |
| 4,853,699 | 8/1989 | Easton | 342/25 |
| 4,866,448 | 9/1989 | Rocca et al. | 342/25 |
| 4,924,229 | 5/1990 | Eichel et al. | 342/25 |
| 4,929,950 | 5/1990 | Freeman et al. | 342/25 |
| 4,978,961 | 12/1990 | Williams et al. | 342/25 |

Primary Examiner—Mark Hellner

[57] ABSTRACT

A method of correcting rotational motion error in SAR and ISAR imagery includes shifting the center of the image to zero doppler and thus to the center of rotation of the target being imaged, selecting a dominant scatterer at an off-center range cell to provide a phase reference, calculating the rotational motion error function from the phase of the selected scatterer, using the rotational motion error function to interpolate raw radar return image data between the original unequal angular samples to obtain equal angular samples of the target reflectivity function, and performing an image quality check and producing a value which is a relative measure of focus of the image. Also, the method includes repeating the steps starting with selecting a new dominant scatterer as a phase reference. Further, the performing step of the method includes storing and comparing the relative measures of focus provided by repeating of the steps to arrive at the corrected image which is the most focused and then saving the corrected image determined to be the the most focused.

8 Claims, 8 Drawing Sheets

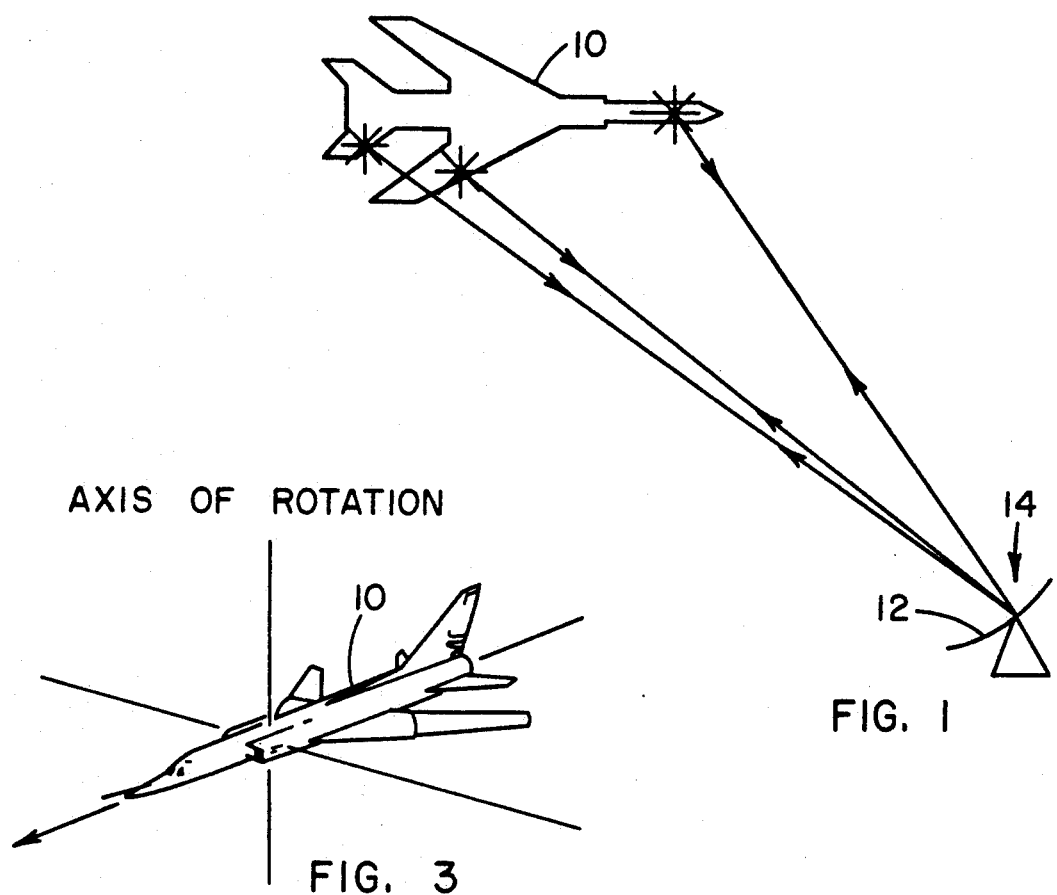
FIG. 1
FIG. 3
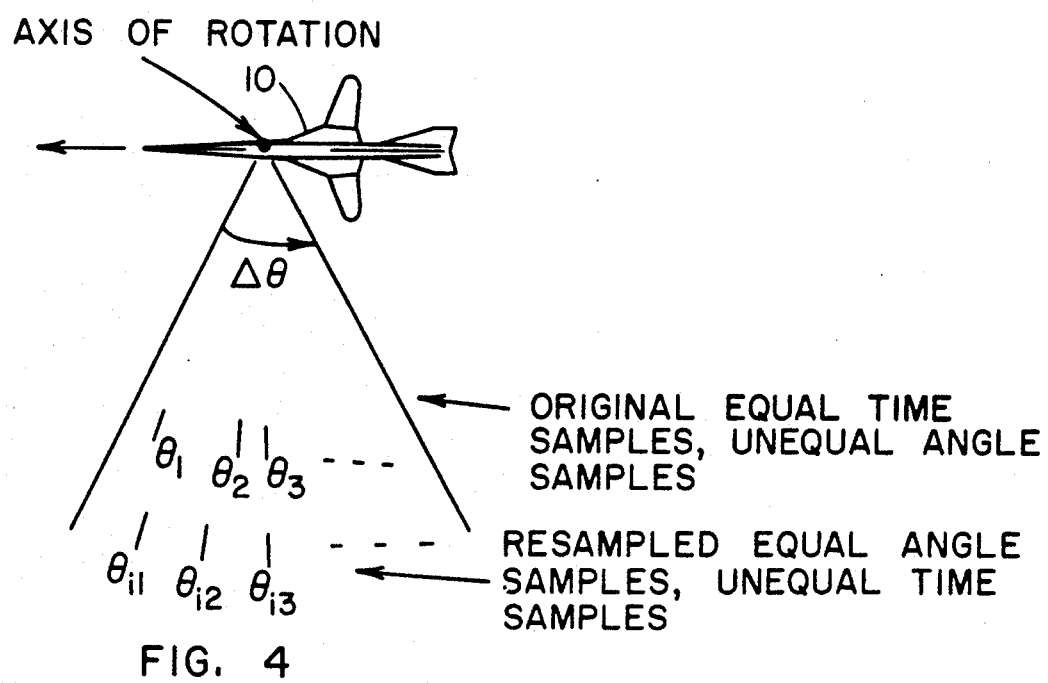
FIG. 4

METHOD OF CORRECTING ROTATIONAL MOTION ERROR IN SAR AND ISAR IMAGERY

BACKGROUND OF THE INVENTION

1. Field of the Invention

The present invention generally relates to SAR/ISAR imaging systems and, more particularly, is concerned with a method of correcting rotational motion error in SAR and ISAR imagery to increase focus and clarity of radar images.

2. Description of the Prior Art

In synthetic aperture radar (SAR) and inverse synthetic aperture radar (ISAR) systems, the radar signal processing equipment operates on a basic assumption that the relative motion between the radar and the target being imaged is in a straight line at a constant speed. In the real world, the relative motion is subject to deviations due to many causes and it is therefore necessary to provide compensation for these perturbations Rotational motion error terms occur in synthetic aperture radar (SAR) and inverse synthetic aperture radar (ISAR) imagery when the relative viewing angle between the radar and the target to be imaged, deviates from being linear throughout the imaging integration time. These error terms can cause significant image blurring. The problem to be resolved is to estimate and remove phase error terms which are caused by the unwanted rotational motion perturbations in the real SAR and ISAR imagery, thereby focusing the image.

In both SAR and ISAR imaging, the cross range information is obtained by interrogating the target at constant increments in viewing angle change between the target and the radar over a certain time period. In ISAR the target rotates relative to the stationary radar, whereas in SAR the radar moves in an arc to provide the viewing angle change. If the rotation rate deviates from being constant during the imaging time in either case, there will be phase errors in the image data and the imagery will be blurred.

Consequently, a need exists for a way to resolve the aforementioned problem of rotational motion error occurring in both SAR and ISAR imagery in order to reduce image blurring and improve image clarity.

SUMMARY OF THE INVENTION

The present invention provides a rotational error correction method designed to satisfy the aforementioned needs. The method of the present invention can correct rotational error in SAR and ISAR imagery and thereby increases focus and clarity of radar images.

In accordance with the principles of the present invention, the rotational motion deviations are estimated through exploiting information contained in the image data itself. With this rotational motion error function estimate, the image data can be interpolated between the original unequal angular samples to obtain equal angular samples of the target being imaged.

Accordingly, the present invention is directed to a method of correcting rotational motion error in SAR and ISAR imagery which comprises the steps of: (a) shifting the center of the raw radar return image data to zero doppler and thus to the center of rotation of the target being imaged; (b) selecting a dominant scatterer in the image data at an off-center range cell of the target to provide a phase reference; (c) calculating the rotational motion error function from the phase reference of the selected scatterer; (d) using the rotational motion error function to interpolate raw radar return image data between the original unequal angular samples to obtain equal angular samples of the target reflectivity function; and (e) performing an image quality check and producing a value which is a relative measure of focus of the image. Further, the method includes repeating the steps starting with selecting a new dominant scatterer as a phase reference.

More particularly, the performing step of the method includes producing a plurality of values constituting relative measures of focus corresponding to the repeating of such steps starting with selecting the new dominant scatterer. Also, the performing step of the method includes storing the relative measures of focus produced by repeating the steps that started with selecting the new dominant scatterer, comparing the relative measures of focus to determine the corrected image which is the most focused, and saving the corrected image determined to be the most focused.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a schematic representation of one basic configuration for ISAR imaging in which an aircraft is the target being imaged and to which is applied the rotational motion error correction method of the present invention.

FIG. 3 is a representation of the aircraft target illustrating the axis of its rotation relative to a ground-based ISAR system employing the rotational motion error correction method of the present invention.

FIG. 4 is a representation of the resampling of the aircraft target's reflectivity at equal angular samples in accordance the rotational motion error correction method of the present invention.

DETAILED DESCRIPTION OF THE INVENTION

Figure 2:
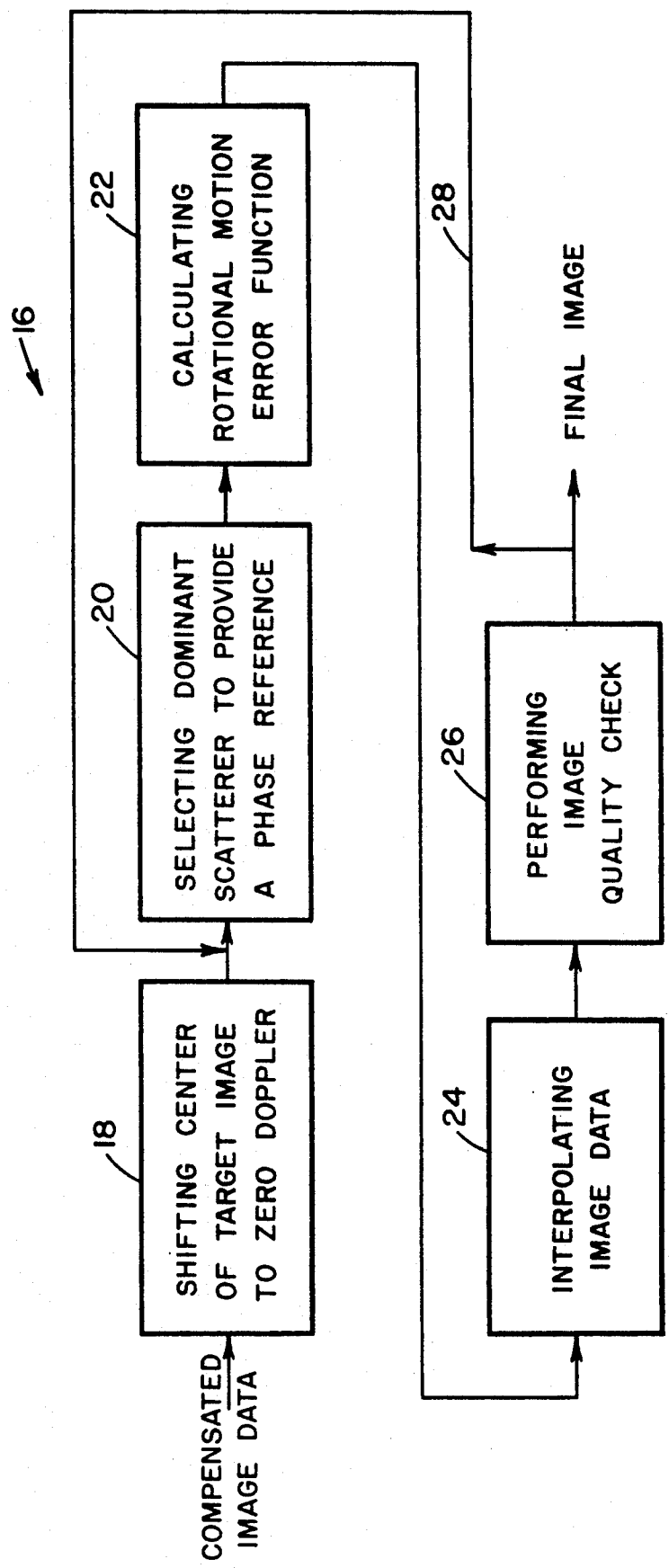
FIG. 2 is a flow diagram of the sequence of steps comprising the method of correcting rotational motion error in SAR and ISAR imagery in accordance with the present invention.

Referring now to the drawings, and particularly to FIG. 1, there is illustrated a schematic representation of one basic configuration of ISAR imaging in which a moving aircraft 10 is the target being imaged by a stationary radar 12 of a conventional ground-based ISAR system 14. Although the aircraft target 10 may be traveling in a straight line, as it crosses the radar 12 there is a slight change in the viewing angle, that is, the aircraft target 10 is rotating slightly relative to the radar 12. This results in the generation of an ISAR image.

Essentially, the problem to be resolved is to estimate and remove phase error caused by unwanted rotational motion perturbations in real SAR and ISAR imagery, thereby focusing the image. In both SAR and ISAR, the cross range information is obtained by interrogating the target 10 at constant increments in viewing angle change between the target and the radar over a certain time period. In ISAR, the target rotates and in SAR the radar moves in an arc to provide the viewing angle change. If the rotation rate deviates from being constant during the imaging integration time in either case, there will be phase errors in the image data and the imagery will be blurred. The method of the present invention estimates the rotational motion deviations through exploiting information contained in the image data. With this rotational motion error function estimate, the image data can be interpolated between the original unequal angular samples to obtain equal samples in angle, as schematically represented in FIG. 4.

Referring to FIG. 2, there is illustrated a flow diagram 16 of the method of the present invention for correcting rotational motion error which can be applied to the ISAR image produced by the conventional ISAR system 14. The rotational motion error correction method represented by flow diagram 16 is sufficiently general to be applicable to both SAR and ISAR imagery.

The basic steps of the rotational motion error correction method of the present invention set forth in the flow diagram 16 of FIG. 2 are represented by blocks 18, 20, 22, 24 and 26. As per block 18, the first step of the method is shifting the center of the raw radar return image to zero doppler and thus to the center of rotation of the target 10 being imaged. As per block 20, the second step is selecting a dominant scatterer in the image data at an off-center range cell to provide a phase reference. As per block 22, the third step is calculating the rotational motion error function from the phase reference of the selected scatterer. As per block 24, the fourth step is using the rotational motion error function to interpolate raw radar return image data between the original unequal angular samples to obtain equal angular samples of the target reflectivity function. As per block 26, the fifth step is performing an image quality check to produce a value which is a relative measure of the focus of the corrected image. Also, as per line 28, the method includes repeating the second through fifth steps of blocks 20 through 26, starting with selecting a new dominant scatterer as a phase reference. Further, the performing step of block 26 includes storing and comparing the relative measures of focus provided by the repeating of the second through fifth steps of the method to determine the one of the corrected image which is the most focused. Finally, the performing step of block 26 includes saving the corrected image determined to be the one most focused.

Rotational motion error occurs in SAR and ISAR imagery when the relative viewing angle between the radar (observer) and the target (object) to be imaged, deviates from being linear throughout the imaging integration time. The imaging integration time refers to the total time it takes for rotation to occur through a large enough angle to provide the desired resolution in the cross range dimension. There are two dimensions in space of interest: the range dimension (along the line of sight of the radar) and the cross range dimension (across the line of sight of the radar). The cross range dimension which is obtained by the synthesized aperture, relates to the fact that there is movement through an angle. Prior to carrying out the first step of the method represented by block 18 of the flow diagram 16, the raw radar image data is preprocessed in a known manner to eliminate translational, or radial, motion of the target 10 along the range dimension, that is, along the line of sight of the radar 12, so that predominantly only rotational motion error will remain.

Referring to block 18 of FIG. 2, the first step of the method—shifting the center of the raw radar return image to zero doppler—ensures that the center of the image represents the center of rotation or the center of the scene to be imaged. The input to the first step is preprocessed raw radar image data which is essentially free of phase errors, excluding low level residual phase perturbations and, of course, rotational motion errors.

The first step is a simple but necessary step in the overall correction process. This step is necessary because many times the line-of-sight motion of the radar relative to the target is great enough so that the actual center of rotation of the target is not known. In these cases the center of rotation for the image is chosen and a phase correction term is applied to the image to eliminate the residual phase terms.

An example of how this is actually accomplished in ISAR imaging is given below. This process is called tracking the phase of a scatterer. Tracking the phase of a scatterer consists of evaluating the phase function, in the range cell in which the scatterer is located, across the aperture in the time domain. Generally, the complex function across each aperture will be of this form:

$$g(t) = A_m(t)e^{j(\omega_0 t + \phi_m(t) + \phi_{TRAN}(t) + \phi_{ROT_m}(t) + \phi_e(t))} + \eta_m(t)$$

where m = total number of range bins
$A_m(t)$ = amplitude function across aperture
$\phi_m(t)$ = composite error-free, phase return from scatters
$\phi_{TRAN}(t)$ = translational motion error terms
$\phi_{ROT_m}(t)$ = rotational motion error terms
$\eta_m(t)$ = residual noise errors
$\phi_e(t)$ = residual phase errors Assuming sufficient signal-to-noise ratio, $\eta_m(t)$, may be neglected, and also $\phi_e(t)$ is assumed negligible. For the range cell in which the scatterer is located, m:, the complex function, g(t), is defined as follows:

$$g(t) = A_{m1}(t)e^{j(\omega_0 t + \phi_{TRAN}(t) + \phi_{ROT_{m1}}(t))}$$

The correction for the image is performed by multiplying each complex number in a given cross range cell by the complex conjugate of the complex value in range cell $m_1$. To avoid altering the magnitude of the complex values across the cross range cells, each value is divided by the magnitude of the complex number in range cell $m_1$. This process is done for each cross range cell and the phase of range cell $M_1$ is seen to be forced to zero. The phase correction term, $g_c(t)$ can therefore be expressed as follows, $$g_c(t) = g^*(t)/A_{m1}(t)$$

After correction by multiplying g(t) with $g_c$(t) for each range cell, the function, $g_f(t)$ is obtained, $$g_f(t) = A_m(t)e^{j(\phi_m(t) - \omega_e t + \phi_{ROT_m}(t) - \phi_{ROT_{m1}}(t))},$$
for $m \neq m_1$ $$g_f(t) = A_{m1}(t), \text{ for } m = m_1$$

After the first step is completed, then in carrying out the next steps the target can be visualized, as shown in FIG. 3, rotating about an axis of rotation, such as while resting on a platform.

Referring to block 20 of FIG. 2, the second step of the method—selecting a dominant scatterer in the image data at some off-center Doppler cell location to provide a phase reference—must be carried out because from the phase of this scatterer, the rotational motion error function is calculated. A scatterer is defined as a theoretical point of reflectivity on the target to be imaged. In SAR and ISAR imaging an assumption is made that the target to be imaged consists of distinct scattering points.

Figure 5:
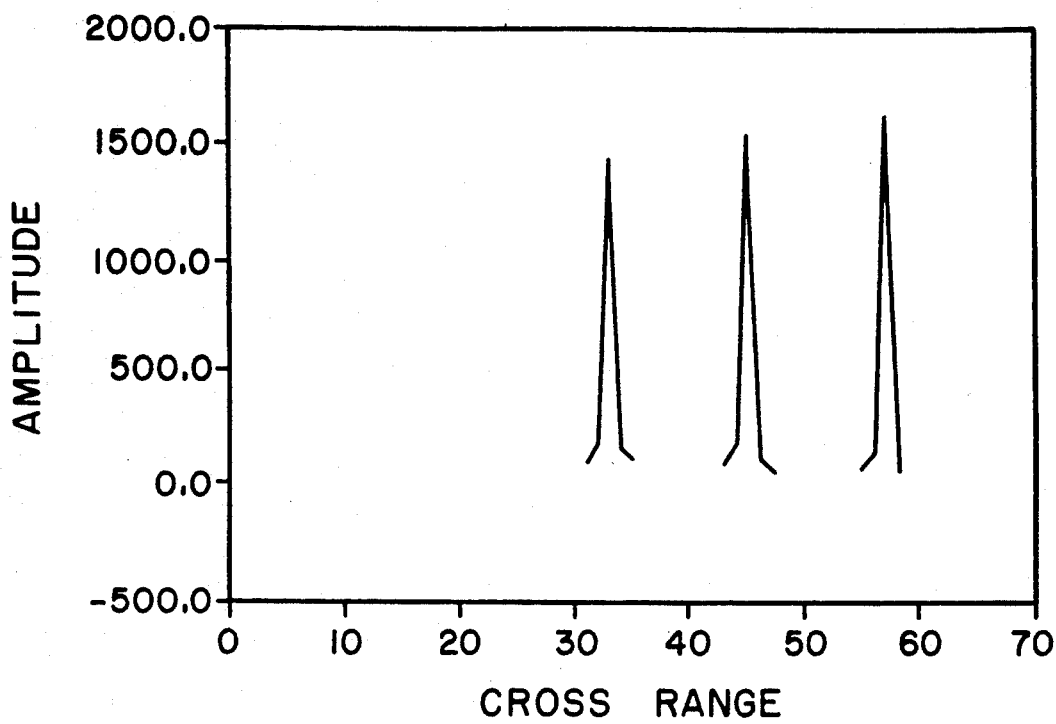
FIG. 5 is a graph of the cross range dimension versus amplitude of three point scatterers in one range cell of the target illuminated by the ground-based ISAR system employing the rotational motion error correction method of the present invention.
Figure 6:
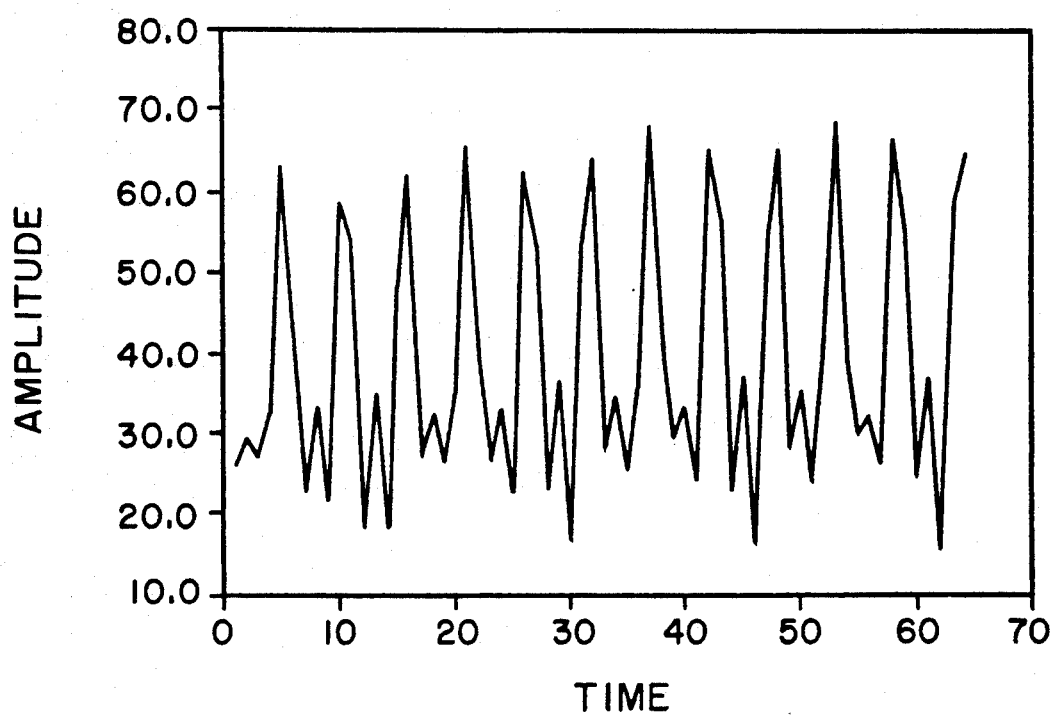
FIG. 6 is a graph of time versus amplitude of the three point scatterers of FIG. 5 after transformation to the time domain.
Figure 7:
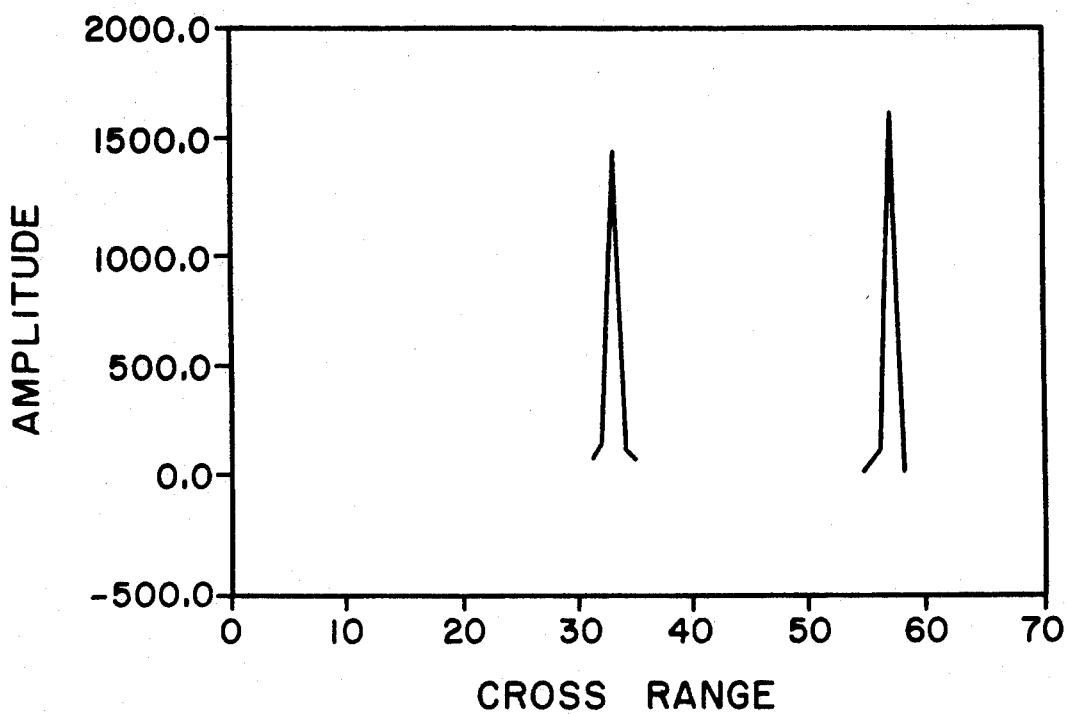
FIG. 7 is a graph of the cross range dimension versus amplitude of two point scatterers in one range cell of the target illuminated by the ground-based ISAR system employing the rotational motion error correction method of the present invention.
Figure 8:
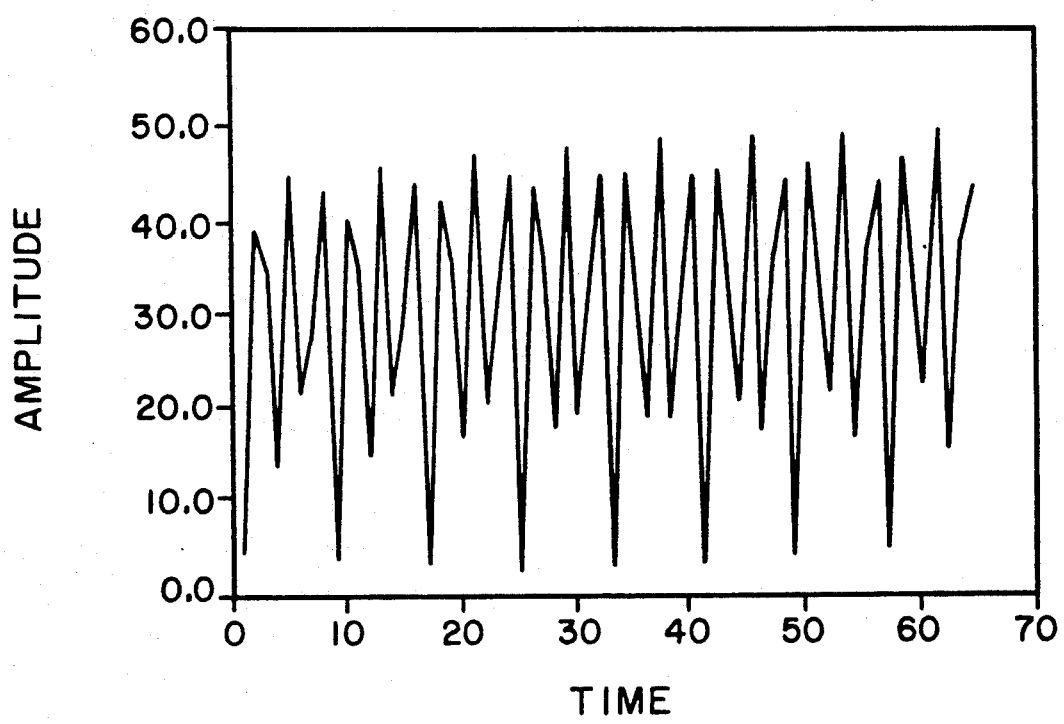
FIG. 8 is a graph of time versus amplitude of the two point scatterers of FIG. 7 after transformation to the time domain.
Figure 9:
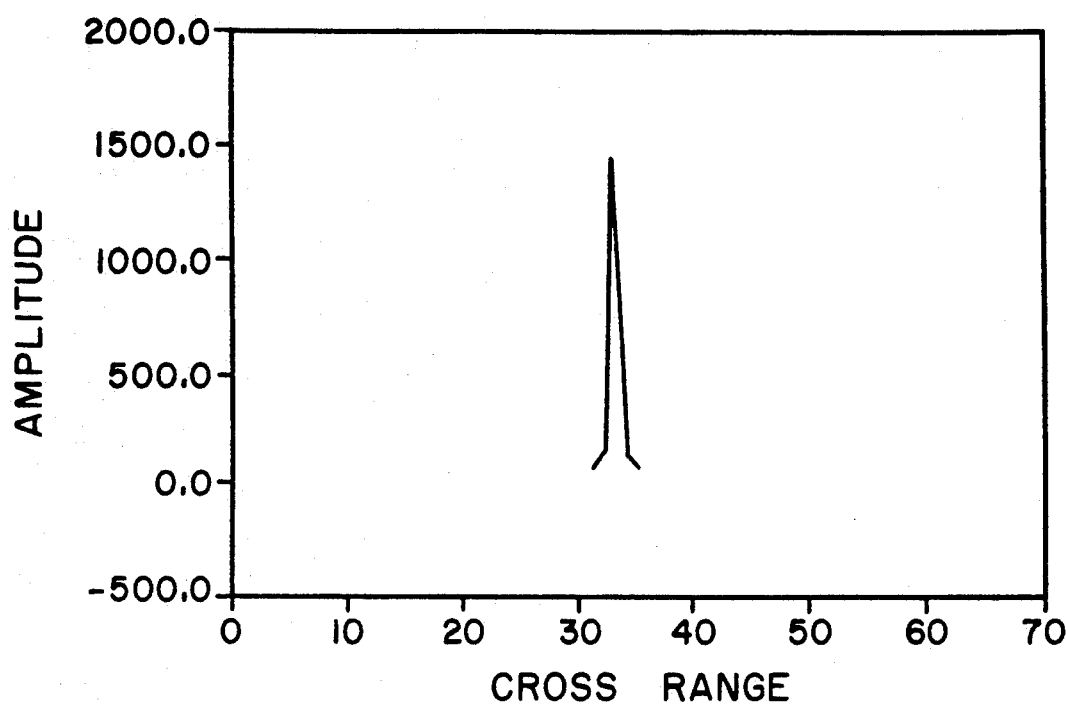
FIG. 9 is a graph of the cross range dimension versus amplitude of a single point scatterer in one rang cell of the target illuminated by the ground-based ISAR system employing the rotational motion error correction method of the present invention.
Figure 10:
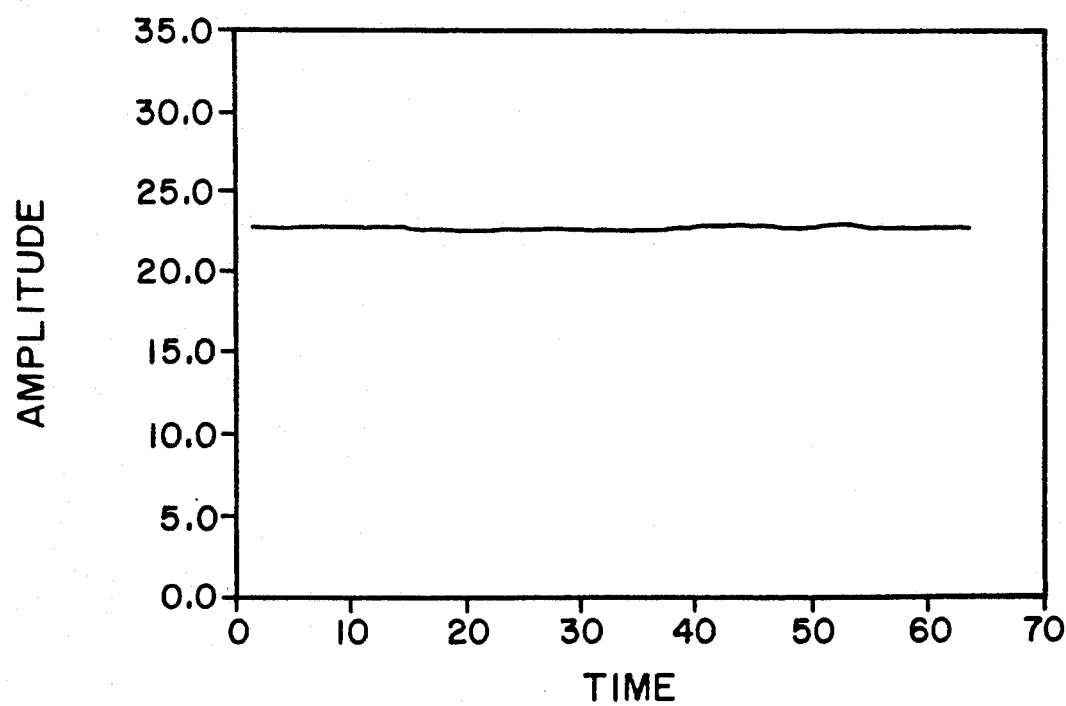
FIG. 10 is a graph of time versus amplitude of the single point scatterer of FIG. 9 after transformation to the time domain.

Thus, in order to arrive at an error function estimate, in accordance with the second step of the rotational motion error correction method, a single, dominant scatterer in any range cell of the image must be located and selected. Two criteria have been established in helping determine in which range cell there exists a single scatterer of sufficient signal-to-noise ratio. The ideal scatterer will have the maximum amplitude and the minimum variance of the magnitude function in the time domain, $A_m(t)$. FIGS. 5, 7 and 9 respectively show three scatterers, two scatterers and one scatterer in a range cell and FIGS. 6, 8 and 10 show how the variance of $A_m(t)$ across the aperture is correspondingly affected. It is clear that the range cell of FIG. 9 with only one scatterer has the minimum variance (see FIG. 10) of the three cases. The particular implementation of these criteria which has worked well has been to choose the top ten scatterers in magnitude, and of those ten, the range cell with the minimum variance is the one selected. It is this range cell where the scatterer is chosen to perform the rotational motion error correction.

The phase of the selected dominant scatterer on the aircraft target 10 will provide an estimate of the rotation rate of the target. Since all other sources of error have been removed by this time, tracking the phase of this scatterer is the same as evaluating the motion of the scatterer and all of that motion can be attributed to rotation of the target. The phase should be close to linear. However, the target will likely not be moving at a constant rotation rate (which is the underlying assumption of the ISAR) but may instead be jiggling back and forth; so the phase of the selected scatterer will be moving back and forth.

Figure 11:
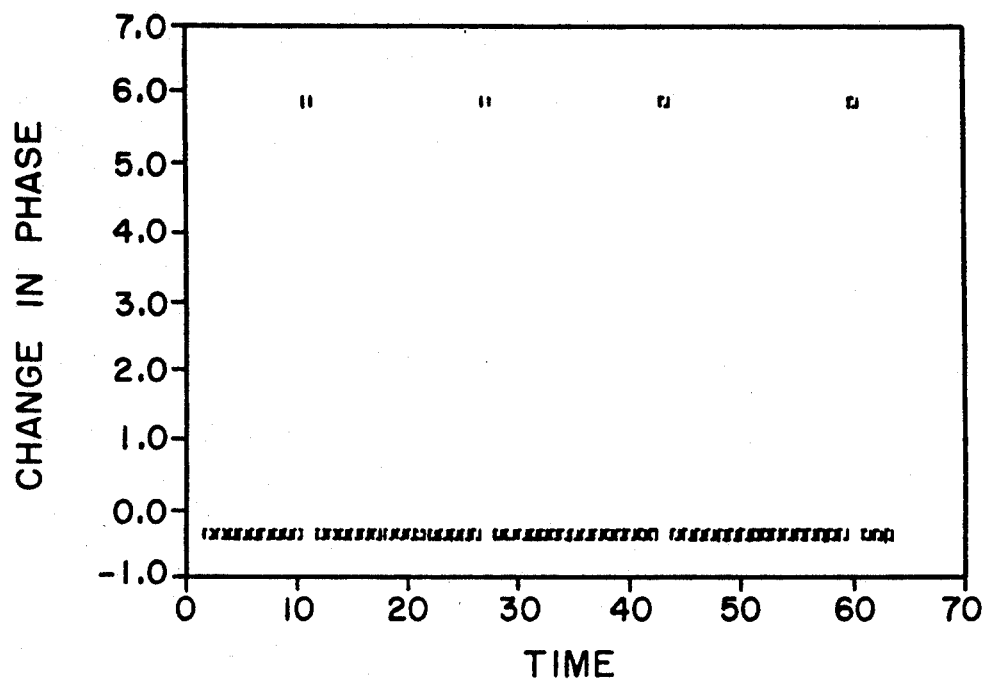
FIG. 11 is a graph of the phase gradient for on range cell including spikes resulting from initial modules 2 phase function.
Figure 12:
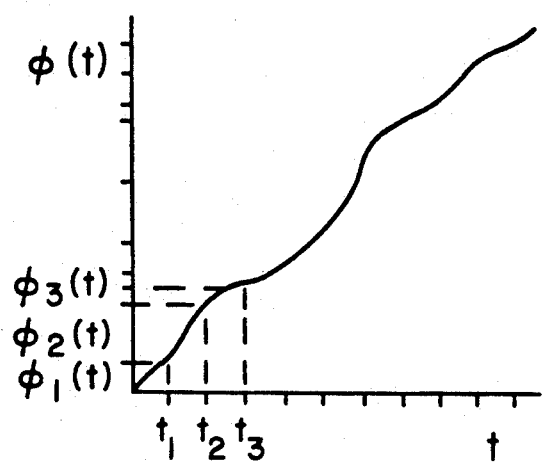
FIG. 12 is a graph of the phase of a selected dominant scatterer with respect to equal time samples after unwrapping of the initial phase function in accordance with the rotational motion error correction method of the present invention.

Referring to block 22 of FIG. 2, the third step of the method—calculating the rotational motion error function from the phase reference of the selected scatterer—is now undertaken. Once the dominant scatterer to be used as a phase reference is selected, a phase versus time relationship must be derived to arrive at an estimate of the target's instantaneous viewing angle change. To do this, the phase function must be "unwrapped", since the phase relation with respect to time varies from −pi to pi. Unwrapping the phase consists of first calculating the $\Delta\phi_\omega(kT)$ term from sample to sample to arrive at a function similar to the one shown in FIG. 11, $$\Delta\phi_w(kT) = \phi_w(kT) - \phi_w((k-1)T)$$

where k = 1, total number of bursts
T = sample period
$\phi_\omega(kT)$ = original wrapped phase function The difference between the dc value and the value of the spikes in FIG. 11 is 2 pi. Once the spikes are compensated by 2 pi to arrive at the new function, $\Delta\phi_c(kT)$, a phase vs. time function as in FIG. 12 may be calculated as follows, $$\phi(kT) = \Delta\phi_c(kT) + \phi((k-1)T)$$

Figure 14:
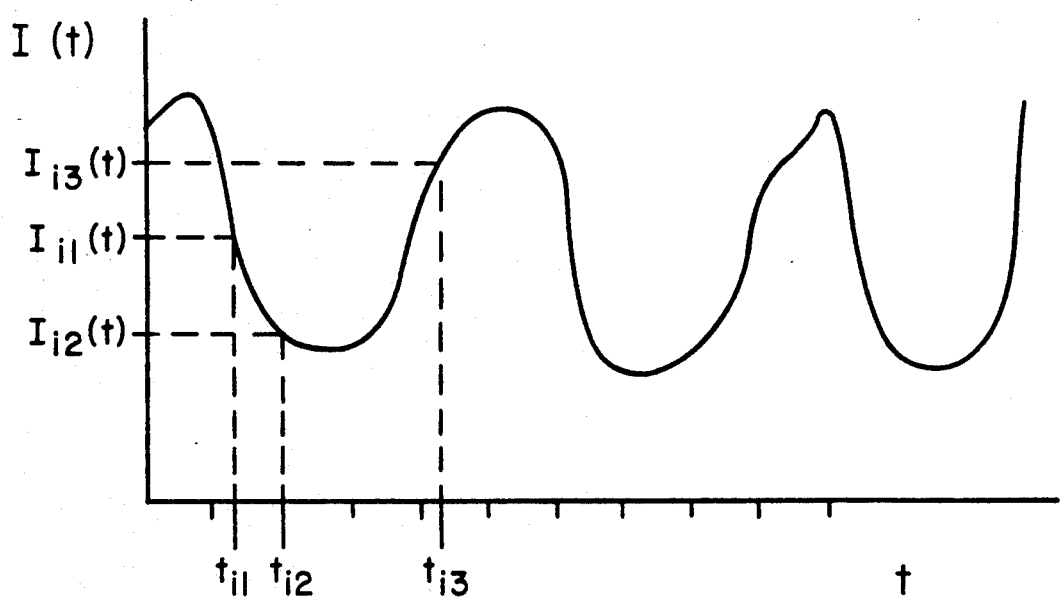
FIG. 14 is a graph of the interpolated inphase (I) values of the radar return versus time using the unequal time samples of FIG. 13.
Figure 13:
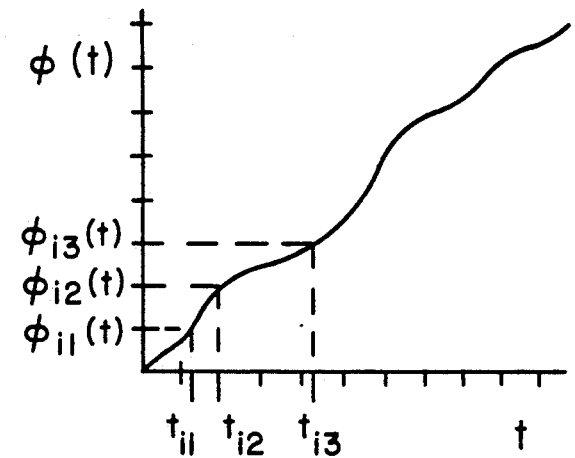
FIG. 13 is a graph of the phase of the selected dominant scatterer with respect to equal phase samples and unequal time samples.

Since $f_d = (\frac{1}{2}\pi)(d\phi/dt)$, $d\phi/dt$ is proportional to $d\theta/dt$ for a single scatterer in a range cell, assuming a small viewing angle change. Therefore, $d\phi/dt$ is a good estimate of the rotation rate of the target assuming rigid body motion. Given this information, the phase of this scatterer is forced to be constant between successive frequency bursts by dividing the phase axis in FIG. 12 into k equally spaced phase values. The corresponding valve for t is then linearly interpolated as is shown in FIG. 13. This provides the times that the viewing angle change of the target is constant from sample to sample. These times are then used to interpolate the In-phase (I) and Quadrature (Q) values (FIG. 14 shows interpolation of the In-phase component.)

To summarize, in the third step the phase must first be unwrapped in order to calculate the rotational motion error. Before unwrapping, the phase wraps around every 2 pi. Once it is unwrapped and drawn out as a phase vs. time graphic representation, the next step is to obtain the rotational motion error at a linear rotation rate.

Referring to block 24 of FIG. 2, the fourth step of the method—interpolating the image data in time—is now undertaken. Using the rotational motion error function, the raw complex radar image data is interpolated between the original unequal angular samples to obtain equal angular samples of the target reflectivity function. The interpolation process is performed in the cross range dimension for each range cell. This is done before the cross range Fourier transforms are performed.

There are two steps involved in this interpolation procedure. In the first step, a computationally efficient since function interpolator is implemented. The since function is defined by $y(x) = \sin(x)/x$. If the input signal is sampled at least at the Nyquist sampling rate, then this signal can be perfectly reconstructed by convolving the signal with the since function.

Figure 16:
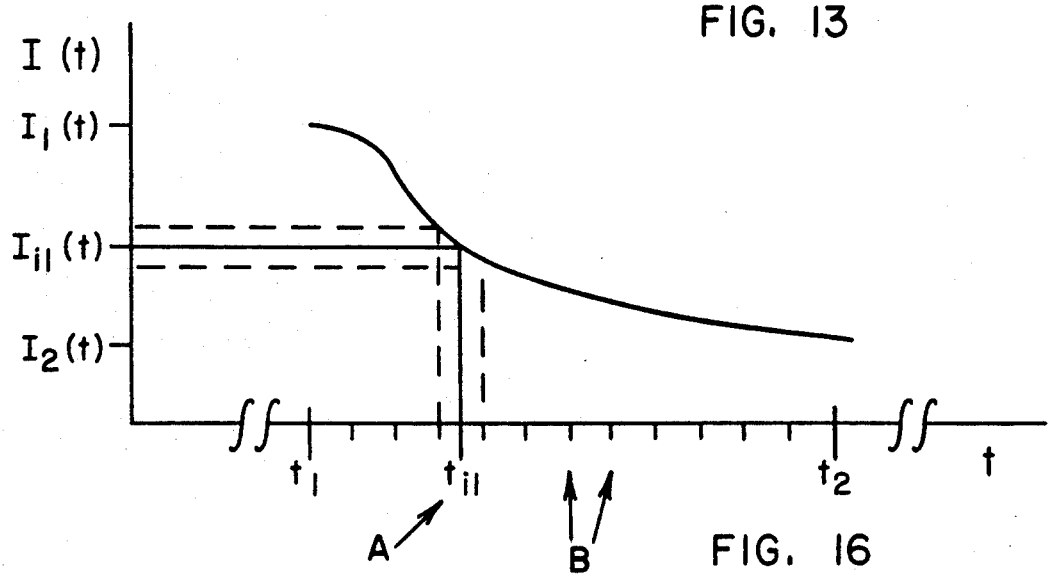
FIG. 16 is a graph of interpolated inphase quadrature values versus time illustrating interpolation in accordance with the rotational motion error correction method of the present invention.
Figure 15A:
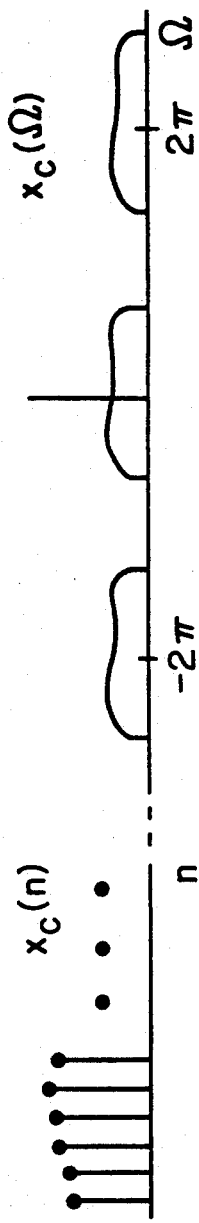
FIG. 15A is a waveform illustrating the spectrum of original radar return signals on the left and the spectrum of a fourier transform on the right being the frequency domain representation of the signal spectrum on the left.
Figure 15B:
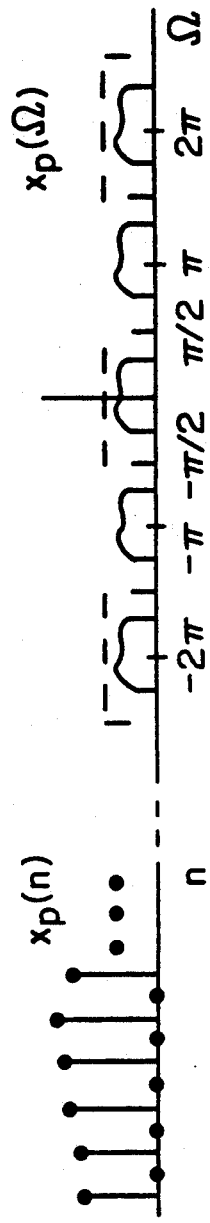
FIG. 15B is a waveform illustrating the spectrum of zero-padded signals on the left and the spectrum of a fourier transform on the right being the frequency domain representation of the signal spectrum on the left.
Figure 15C:
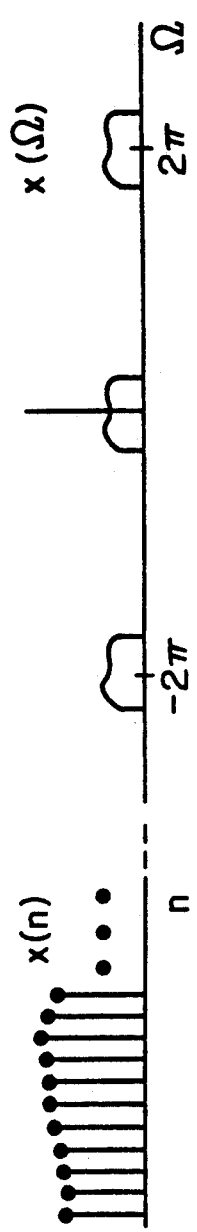
FIG. 15C is a waveform illustrating the spectrum of interpolated signals on the left and the spectrum of a fourier transform on the right being the frequency domain representation of the signal spectrum on the left.

The first part of the since function interpolator consists of inserting zeros between each sample of the original signal, $x_d(n)$. (FIG. 15 illustrates the since function interpolation process with one zero padded between each sample.) This has the effect of aliasing the original signal in the frequency domain (See FIG. 15B). After a Fouier transform of the zero-padded data is performed, a low-pass filter operation is performed in the frequency domain to remove the aliased part of the signal, $X_p(\Omega)$ (see FIG. 15C). Applying a low-pass filter in this way is the same as using the since function to calculate the interpolated values. Then, after an inverse Fourier transform is performed, the result, $x(n)$, is an interpolation of the original signal. If a finer degree of interpolation is desired, one can zero-pad to a larger extent. FIG. 16 shows interpolation of the In-phase component with a zero-padding factor of 11.

The second step of the interpolation process is simply to linearly interpolate between the I and Q values calculated by the since function interpolator. In FIG. 16, the single arrow A points to time value at which the corresponding I value is linearly interpolated, whereas the double arrows B point to time values at which the since function interpolator calculates the corresponding I value.

To summarize, step four involves the interpolation of the raw data obtained at non-linear rotation rates to arrive at data at a linear rotation rate. The raw data before interpolation is essentially a record of the reflectivity of the target at unequal angular samples or, in other words, there is a rotational motion error function superimposed on a linear rotation rate, meaning that the target is rotating at a linear rate and is also jiggling in a non-linear fashion. The interpolation is undertaken to find out what the reflectivity function is at the linear rotation rate.

Referring to block 26 of FIG. 2, the fifth step of the method—performing an image quality check—is now undertaken. This involves the performance of a check on the interpolated image data to determine how well focused it is and thus whether the earlier steps have produced the result desired. Specifically, the image quality check produces a value which is a relative measure of focus.

Thus, to verify that the proper scatterer is chosen to provide an estimate of motion error terms in ISAR imaging, an image quality measurement algorithm has been developed. This algorithm outputs a value which indicates the relative amount of focus in an image. The algorithm consists of measuring the amount of focus in each range cell and summing to get one value for the whole image. The motivation for evaluating the quality of each range cell individually comes from realizing that translational and rotational motion error, in general, cause blurring in the cross range dimension. The measure of the amount of focus for each range cell consists of measuring the variance $V(n)$ of the magnitude function of the ISAR image for each range cell, $$V(n) = \sum_{n=1}^{n=N} \frac{(x(n) - \sigma)^2}{N}$$

where
  N = number of cross range cells
  $x(n)$ = magnitude function of a given range cell
  $\delta$ = the mean of $x(n)$.

The variance will be maximized when there is the largest amount of focus in the range cell. Therefore, the largest value resulting from the summation of the variances of all the range cells indicates the best-focused image. This value is a relative term and cannot be used to determine which of any number of images derived from separate raw data is the best-focused image. This image quality check value serves to determine the relative performance of different correction functions on one set of raw data.

Finally, steps two through five of the method are repeated several times starting with selection of a new dominant scatterer as a phase reference. A new measure of focus is stored for each iteration through the method, and the image which is the most focused is saved as the final image.

The rotational motion error correction method of the present invention solves several more specific problems relative to the estimation and removal of rotational motion error terms in actual ISAR and SAR systems. First, no external measurement data regarding the actual instantaneous viewing angle change between the target and the radar is necessary for the error function estimation. The error function is estimated using only the data recorded from the coherent imaging radar. Next, in the case of ISAR imaging, in addition to actual field conditions, the imaging process is applicable for use in controlled conditions such as in the case of indoor or outdoor test ranges where the target to be imaged rests upon a turntable which rotates at a near constant rate. Finally, the invention solves the problem of automating the process of rotational motion error correction for SAR and ISAR imagery. For real imaging radar systems it is desirable to have a process which is automated, as long as the process is robust.

The rotational motion error correction method of the present invention is sufficiently general to be applicable to both SAR and ISAR imagery The steps of the method, as described above, can be implemented by a software program stored and executed in a conventional general purpose computer. It is the view of the inventor herein that, from the detailed description of the method set forth above, one of ordinary skill in this art can devise a software program to implement the rotational motion error correction method of the present invention without the need to exercise undue experimentation.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely a preferred or exemplary embodiment thereof.

Having thus described the invention, what is claimed is:

1. A method of correcting rotational motion error in SAR and ISAR imagery, comprising the steps of:
   shifting the center of the image of a target to zero doppler and thus at the center of rotation of the target being imaged;
   selecting a dominant scatterer in a range cell to provide a phase reference;
   calculating the rotational motion error function from the phase reference provided by the selected scatterer;
   interpolating raw radar return image data between the original unequal angular samples by using the rotational motion error function to obtain equal angular samples of a reflectivity function for the target; and
   performing an image quality check to produce a value which constitutes a relative measure of focus of the corrected image.

2. The method of claim 1 further comprising:
   repeating the steps starting with selecting a new dominant scatterer as a phase reference.

3. The method of claim 2 wherein said performing includes producing a plurality of values constituting relative measures of focus corresponding to the repeating of the steps starting with selecting a new dominant scatterer.

4. The method of claim 3 wherein said performing includes:
   storing the relative measures of focus produced by said repeating of the steps; and
   comparing the relative measures of focus to determine the corrected image which is the most focused.

5. The method of claim 4 further comprising:
   saving the corrected image determined to be the most focused.

6. A method of correcting rotational motion error in SAR and ISAR imagery, comprising the steps of:
   shifting the center of the image of a target to zero doppler and thus at the center of rotation of the target being imaged;
   selecting a dominant scatterer in a range cell to provide a phase reference;
   calculating the rotational motion error function from the phase reference provided by the selected scatterer;
   interpolating raw radar return image data between the original unequal angular samples by using the rotational motion error function to obtain equal angular samples of a reflectivity function for the target;
   repeating the steps starting with selecting a new dominant scatterer as a phase reference; and
   performing an image quality check at the end of each repeating of the steps to producing a plurality of values constituting relative measures of focus of the corrected image achieved with each selected dominant scatterer.

7. The method of claim 6 wherein said performing includes:
   storing the relative measures of focus produced by said repetitions; and
   comparing the relative measures of focus to determine the corrected image which is the most focused.

8. The method of claim 7 further comprising: saving the corrected image determined to be the most focused.

* * * * *